1

(12) United States Patent
Zeng et al.

(10) Patent No.: US 10,980,022 B2
(45) Date of Patent: Apr. 13, 2021

(54) COUPLED MODE COMMON UPLINK BURST IN TDD SUBFRAME STRUCTURE

(71) Applicant: QUALCOMM INCORPORATED, San Diego, CA (US)

(72) Inventors: Wei Zeng, San Diego, CA (US); Joseph Binamira Soriaga, San Diego, CA (US); Alexandros Manolakos, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 806 days.

(21) Appl. No.: 15/211,011

(22) Filed: Jul. 15, 2016

(65) Prior Publication Data

US 2017/0164366 A1   Jun. 8, 2017

Related U.S. Application Data

(60) Provisional application No. 62/263,479, filed on Dec. 4, 2015.

(51) Int. Cl.
*H04L 12/00* (2006.01)
*H04W 72/04* (2009.01)
(Continued)

(52) U.S. Cl.
CPC ......... *H04W 72/0453* (2013.01); *H04L 5/005* (2013.01); *H04L 5/0048* (2013.01);
(Continued)

(58) Field of Classification Search
None
See application file for complete search history.

(56) References Cited

U.S. PATENT DOCUMENTS 8,681,687 B2   3/2014 Luo et al.
8,681,697 B2*  3/2014 Kwon .................. H04L 1/1607
                                                          370/328
(Continued)

FOREIGN PATENT DOCUMENTS

CN   102893681 A   1/2013
CN   104106232 A   10/2014
(Continued)

OTHER PUBLICATIONS

Samsung: "Sounding RS Multiplexing in E-UTRA UL-Interaction with PUCCH," R1-073092, 3GPP TSG RAN WG1 Meeting #49bis, Orlando, FL, USA, Jun. 25-29, 2007, pp. 1-4.
(Continued)

*Primary Examiner* — Ajit Patel
*Assistant Examiner* — Lionel Preval
(74) *Attorney, Agent, or Firm* — Haynes and Boone, LLP (57) ABSTRACT

Wireless communications systems and methods related to a coupled mode common uplink burst in Time Division Duplex (TDD) sub-frame structure are disclosed. Upon receiving a signal requesting a user to transmit a sounding reference signal (SRS) and a control channel within a common uplink (UL) burst in each sub-frame communicated between the user and a base station, the user transmits the common UL burst comprising the SRS coupled with the control channel spanning the same frequency bandwidth.

53 Claims, 6 Drawing Sheets

(51) Int. Cl.
*H04L 5/14* (2006.01)
*H04L 5/00* (2006.01)
*H04W 28/02* (2009.01)
*H04W 88/02* (2009.01)
*H04W 88/08* (2009.01)

(52) U.S. Cl.
CPC .......... *H04L 5/0053* (2013.01); *H04L 5/0055* (2013.01); *H04L 5/14* (2013.01); *H04L 5/1469* (2013.01); *H04W 28/0278* (2013.01); *H04W 72/042* (2013.01); *H04W 72/0413* (2013.01); *H04W 88/02* (2013.01); *H04W 88/08* (2013.01)

(56) References Cited

U.S. PATENT DOCUMENTS

| | | | |
|---|---|---|---|
| 10,306,594 B2 | 5/2019 | Ji et al. | |
| 2009/0196164 A1* | 8/2009 | Vook | H04L 5/0094 370/208 |
| 2012/0281555 A1* | 11/2012 | Gao | H04L 5/0051 370/252 |
| 2014/0169319 A1* | 6/2014 | Yang | H04W 72/0413 370/329 |
| 2014/0211767 A1* | 7/2014 | Lunttila | H04W 72/1289 370/336 |
| 2014/0314016 A1 | 10/2014 | Kim et al. | |
| 2015/0223231 A1 | 8/2015 | Noh | |
| 2015/0289264 A1 | 10/2015 | Sandberg et al. | |
| 2015/0304957 A1 | 10/2015 | Noh et al. | |
| 2016/0050658 A1 | 2/2016 | Tabet et al. | |
| 2017/0033908 A1* | 2/2017 | Hwang | H04L 5/0053 |
| 2018/0242317 A1* | 8/2018 | Marinier | H04W 56/003 |

FOREIGN PATENT DOCUMENTS

| | | |
|---|---|---|
| EP | 2779513 A3 | 5/2015 |
| WO | 2011156638 A2 | 12/2011 |
| WO | WO-2013153515 A2 | 10/2013 |
| WO | 2014070578 A1 | 5/2014 |
| WO | 2015028089 A1 | 3/2015 |
| WO | WO-2018053359 A1 * | 3/2018 ........... H04L 5/0023 |

OTHER PUBLICATIONS

International Search Report and Written Opinion—PCT/US2016/058509—ISA/EPO—dated Feb. 1, 2017.

Toni L., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU.2014.258115 [retrieved on Feb. 11, 2015].

Toni L., et al., "New Spectrally and Energy Efficient Flexible TDD Based Air Interface for 5G Small Cells," IEEE 79th Vehicular Technology Conference (VTC Spring), May 1, 2014 (May 1, 2014), pp. 1-7, XP055186316, DOI: 10.1109/VTCSpring.2014.7023168.

Toni L., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415 [retrieved on Sep. 22, 2014].

Liu J., et al., "Non-Authorized Frequency Band Access LAA Technology Development and Industry Impact Analysis", Symposium on 2015 LTE Network Innovation, Aug. 20, 2015.

Qualcomm Incorporated: "Uplink Waveform for LAA", R1-151407, 3GPP TSG RAN WG1 #80bis, Apr. 20-24, 2015, Belgrade, Serbia, Apr. 24, 2015, pp. 1-3.

Taiwan Search Report—TW105134652—TIPO—dated Aug. 11, 2020.

Ericsson, "5G-Key Component of the Networked Society," 3GPP RAN Workshop on 5G, RWS-150009, Phoenix, AZ, USA, Sep. 17-18, 2015, 55 pgs., XP051043759, 3rd Generation D Partnership Project, Sophia-Antipolis Cedex, France, Retrieved from the Internet: URL:http://www.3gpp.org/ftp/workshop/2015-09-17_18_RAN_5G/Docs/ [retrieved on Aug. 3, 2017], Slides 5, 33-34.

* cited by examiner

COUPLED MODE COMMON UPLINK BURST IN TDD SUBFRAME STRUCTURE

CROSS REFERENCE TO RELATED APPLICATIONS

The present application claims priority to and the benefit of the U.S. Provisional Patent Application No. 62/263,479, filed Dec. 4, 2015, which is hereby incorporated by reference in its entirety.

TECHNICAL FIELD

This application relates to wireless communication systems, and more particularly to coupled mode common uplink bursts in Time Division Duplex (TDD) sub-frame structures.

INTRODUCTION

Growing demand for data and throughput has been envisioned for $5^{th}$ Generation (5G) networks, which requires a broader frequency spectrum. A plethora of unpaired spectrum is available at a high frequency band, which is also less expensive than the paired spectrum at frequencies of 2 GHz and below. Wireless communications on the unpaired spectrum is typically performed in Time Division Duplex (TDD) mode, where uplink transmission (e.g., transmission from user equipment (UE) to evolved Node B (eNB)) and downlink transmission (e.g., transmission from eNB to UE) share the same frequency spectrum, but are separated in time.

BRIEF SUMMARY OF SOME EMBODIMENTS/EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method for wireless communications includes receiving, at a user equipment (UE) from a base station (BS), a signal requesting the UE to transmit a sounding reference signal (SRS) and a control channel within a common uplink (UL) burst in each sub-frame communicated between the UE and the BS, and transmitting, from the UE to the BS based upon the received signal, the common UL burst comprising the SRS and the control channel spanning the same frequency bandwidth.

In an additional aspect of the disclosure, an apparatus includes a receiver configured to receive, from another apparatus, a signal requesting the apparatus to transmit a sounding reference signal (SRS) and a control channel within a common uplink (UL) burst in each sub-frame communicated between the apparatus and the other apparatus, and a transmitter configured to transmit, to the other apparatus based upon the received signal, the common UL burst comprising the SRS and the control channel spanning the same frequency bandwidth.

In an additional aspect of the disclosure, an apparatus includes means for receiving, from another apparatus, a signal requesting the apparatus to transmit a sounding reference signal (SRS) and a control channel within a common uplink (UL) burst in each sub-frame communicated between the apparatus and the other apparatus, and means for transmitting, to the other apparatus based upon the received signal, the common UL burst comprising the SRS and the control channel spanning the same frequency bandwidth.

In an additional aspect of the disclosure, a computer-readable medium having program code recorded thereon includes program code comprising code for causing a user equipment (UE) to receive, from a base station (BS), a signal requesting the UE to transmit a sounding reference signal (SRS) and a control channel within a common uplink (UL) burst in each sub-frame communicated between the UE and the BS, and code for causing the UE to transmit, to the BS based upon the received signal, the common UL burst comprising the SRS and the control channel spanning the same frequency bandwidth.

In an additional aspect of the disclosure, a method for wireless communications includes transmitting, from a base station (BS) to a user equipment (UE), a signal requesting the UE to transmit a sounding reference signal (SRS) and a control channel within a common uplink (UL) burst in each sub-frame communicated between the UE and the BS, receiving, at the BS, the common UL burst comprising the SRS and the control channel spanning the same frequency bandwidth, and demodulating the received control channel based on the received SRS.

In an additional aspect of the disclosure, an apparatus includes a transmitter configured to transmit, to another apparatus, a signal requesting the other apparatus to transmit a sounding reference signal (SRS) and a control channel within a common uplink (UL) burst in each sub-frame communicated between the other apparatus and the apparatus, a receiver configured to receive the common UL burst comprising the SRS and the control channel spanning the same frequency bandwidth, and a processor configured to demodulate the received control channel based on the received SRS.

In an additional aspect of the disclosure, an apparatus includes means for transmitting, to another apparatus, a signal requesting the other apparatus to transmit a sounding reference signal (SRS) and a control channel within a common uplink (UL) burst in each sub-frame communicated between the other apparatus and the apparatus, means for receiving the common UL burst comprising the SRS and the control channel spanning the same frequency bandwidth, and means for demodulating the received control channel based on the received SRS.

In an additional aspect of the disclosure, a computer-readable medium having program code recorded thereon includes program code comprising code for causing a base station (BS) to transmit, to a user equipment (UE), a signal requesting the UE to transmit a sounding reference signal (SRS) and a control channel within a common uplink (UL) burst in each sub-frame communicated between the UE and the BS, code for causing the BS to receive the common UL burst comprising the SRS and the control channel spanning the same frequency bandwidth, and code for causing the BS to demodulate the received control channel based on the received SRS.

Other aspects, features, and embodiments of the present disclosure will become apparent to those of ordinary skill in the art upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new (e.g., 4G networks) releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Figure 1:
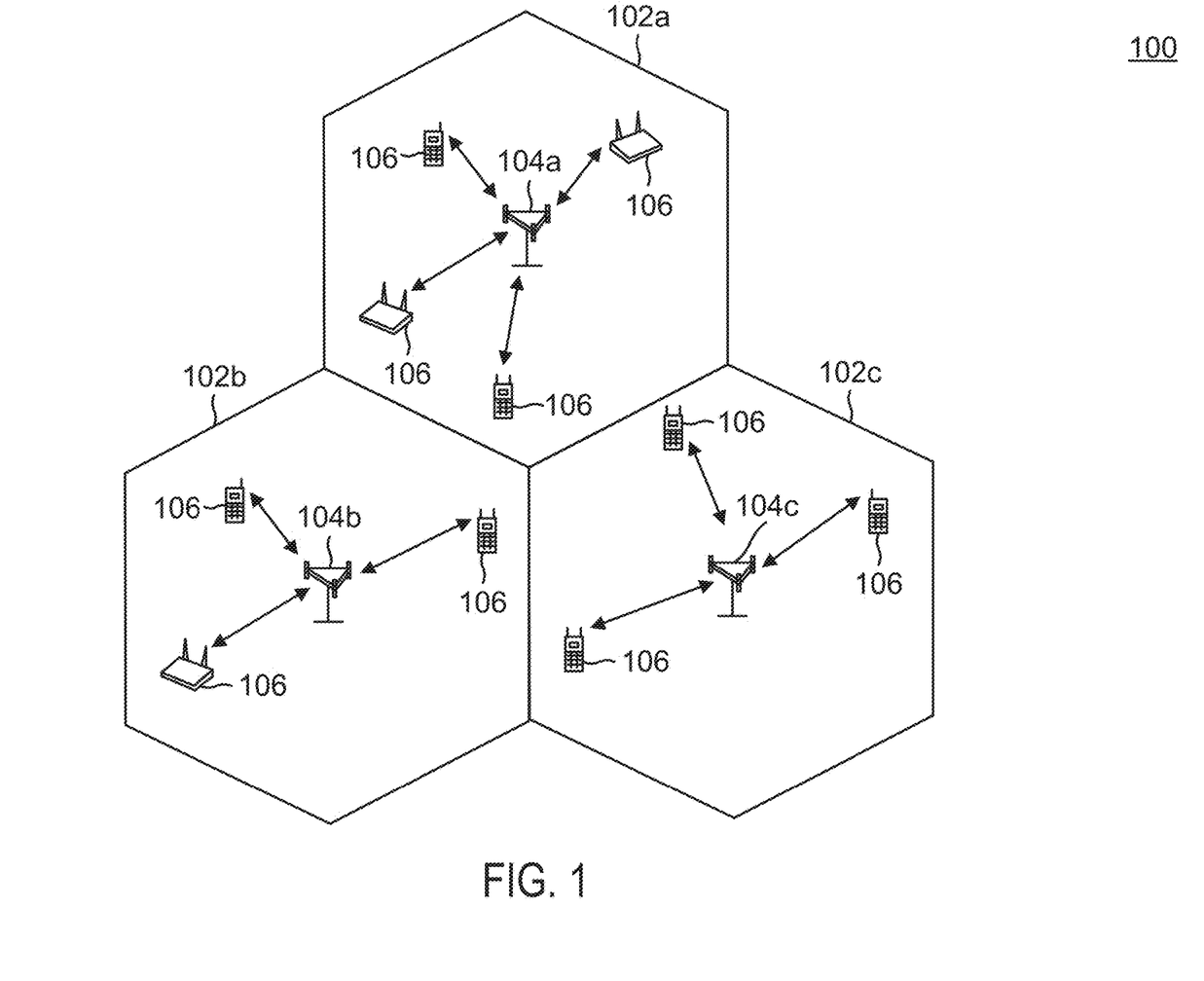
FIG. 1 is a diagram of an exemplary wireless communications environment according to embodiments of the present disclosure.

FIG. 1 illustrates a wireless communication network 100 in accordance with various aspects of the present disclosure. The wireless network 100 may include a number of base stations 104 and a number of user equipment (UE) 106, all within one or more cells 102 as illustrated in FIG. 1. For example, FIG. 1 shows base stations 104a, 104b, and 104c associated with cells 102a, 102b, and 102c, respectively. The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. The communications environment 100 is one example of a network to which various aspects of the disclosure apply.

A base station (BS) 104 as discussed herein can have various characteristics. In some scenarios, it may include an evolved Node B (eNodeB or eNB) in the LTE context, for example. A base station 104 may also be referred to as a base transceiver station or an access point. It will be recognized that there could be one to many base stations, as well as be an assortment of different types such as macro, pico, and/or femto base stations. The base stations 104 may communicate with each other and other network elements via one or more backhaul links. The base stations 104 communicate with the UEs 106 as shown, including via direct wireless connections or indirect, e.g., via relay devices. A UE 106 may communicate with a base station 104 via an uplink and a downlink. The downlink (or forward link) refers to the communication link from a base station 104 to a UE 106. The uplink (or reverse link) refers to the communication link from a UE 106 to a base station 104.

The UEs 106 may be dispersed throughout the wireless network 100, and each UE 106 may be stationary or mobile. A UE may also be referred to as a terminal, a mobile station, a subscriber unit, etc. A UE 106 may be a cellular phone, a smartphone, a personal digital assistant, a wireless modem, a laptop computer, a tablet computer, entertainment device, medical device/equipment, biometric devices/equipment, fitness/exercise devices, vehicular components/sensors, etc. The wireless communication network 100 is one example of a network to which various aspects of the disclosure apply.

Figure 2:
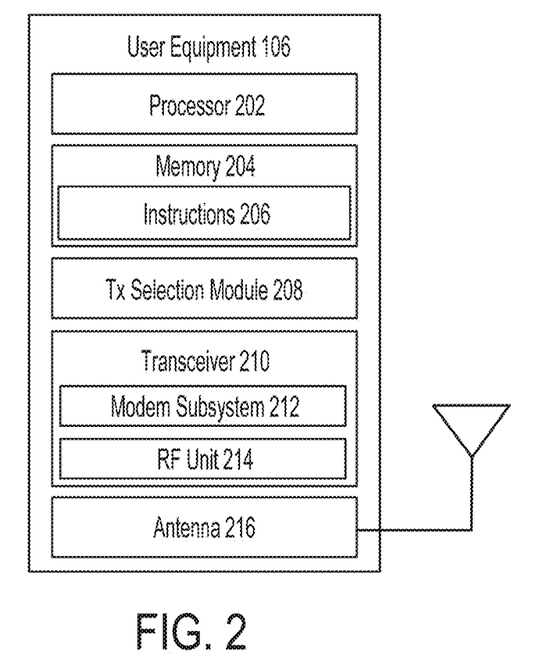
FIG. 2 is a block diagram of an exemplary user equipment (UE) according to embodiments of the present disclosure.

FIG. 2 is a block diagram of UE 106 according to embodiments of the present disclosure. The UE 106 may include a processor 202, a memory 204, a transmission access resource selection module 208, a transceiver 210, and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UE 106 in connection with embodiments of the present disclosure. Instructions 206 may also be referred to as code. The terms "instructions" and "code" may include any type of computer-readable statement(s). For example, the terms "instructions" and "code" may refer to one or more programs, routines, subroutines, functions, procedures, etc. "Instructions" and "code" may include a single computer-readable statement or many computer-readable statements. The transmission access resource selection module 208 may be configured to select and assign resources (e.g., time resources and/or frequency resources) for transmission of uplink bursts from UE 106, discussed in more detail below.

The transceiver 210 may include a modem subsystem 212 and a radio frequency (RF) unit 214. The transceiver 210 is configured to communicate bi-directionally with other devices, such as base stations 104. The modem subsystem 212 may be configured to modulate and/or encode the data from the memory 204 and/or the transmission access resource selection module 208 (and/or from another source, such as some type of sensor) according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a base station 104. Although shown as integrated together in transceiver 210, the modem subsystem 212 and the RF unit 214 may be separate devices that are coupled together at the UE 106 to enable the UE 106 to communicate with other devices.

The RF unit 214 may provide the modulated and/or processed data, e.g. data packets (or, more generally, data messages which may contain one or more data packets and other information), to the antenna 216 for transmission to one or more other devices. This may include, for example, transmission of data to a base station 104 according to embodiments of the present disclosure. The antenna 216 may further receive data messages transmitted from a base station 104 and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
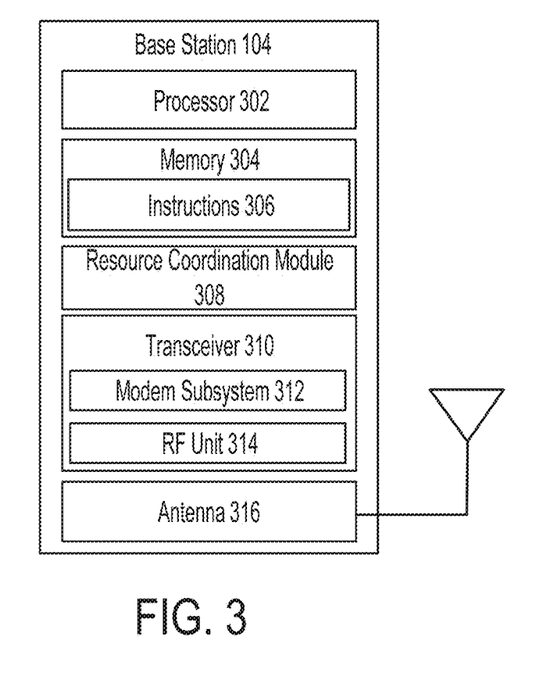
FIG. 3 is a block diagram of an exemplary base station according to embodiments of the present disclosure.

FIG. 3 is a block diagram of an exemplary base station 104 according to embodiments of the present disclosure. The base station 104 may include a processor 302, a memory 304, a resource coordination module 308, a transceiver 310, and an antenna 316. These elements may be in direct or indirect communication with each other, for example via one or more buses. The base station 104 may be an evolved Node B (eNodeB or eNB), a macro cell, a pico cell, a femto cell, a relay station, an access point, or another electronic device operable to perform the operations described herein with respect to the base station 104. The base station 104 may operate in accordance with one or more communication standards, such as a 3rd generation (3G) wireless communication standard, a 4th generation (4G) wireless communication standard, a long term evolution (LTE) wireless communication standard, an LTE-advanced wireless communication standard, or another wireless communication standard now known or later developed (e.g., a next generation network operating according to a 5G protocol).

The processor 302 may include a CPU, a DSP, an ASIC, a controller, a FPGA device, another hardware device, a firmware device, or any combination thereof configured to perform the operations described herein with reference to the base station 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the base station 104 in connection with embodiments of the present disclosure. Instructions 306 may also be referred to as code, which may be interpreted broadly to include any type of computer-readable statement(s) as discussed above with respect to FIG. 2. The resource coordination module 308 may be configured to coordinate resource usage (e.g., time resources and/or frequency resources) among the base stations 104 when communicating with the UEs 106, such as to mitigate or at least reduce interference among the base stations 104.

The transceiver 310 may include a modem subsystem 312 and a radio frequency (RF) unit 314. The transceiver 310 is configured to communicate bi-directionally with other devices, such as UEs 106. The modem subsystem 312 may be configured to modulate and/or encode data according to a MCS, some examples of which have been listed above with respect to FIG. 2. The RF unit 314 may be configured to process (e.g., perform analog to digital conversion or digital to analog conversion, etc.) of modulated/encoded data from the modem subsystem 312 (on outbound transmissions) or of transmissions originating from another source, such as an UE 106. Although shown as integrated together in transceiver 310, the modem subsystem 312 and the RF unit 314 may be separate devices that are coupled together at the base station 104 to enable the base station 104 to communicate with other devices.

The RF unit 314 may provide the modulated and/or processed data, e.g. data packets, to the antenna 316 for transmission to one or more other devices such as UEs 106. The modem subsystem 312 may modulate and/or encode the data in preparation for transmission. The RF unit 314 may receive the modulated and/or encoded data packet and process the data packet prior to passing it on to the antenna 316. This may include, for example, transmission of data messages to UEs 106 or to another base station 104, according to embodiments of the present disclosure. The antenna 316 may further receive data messages transmitted from UEs 106, and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
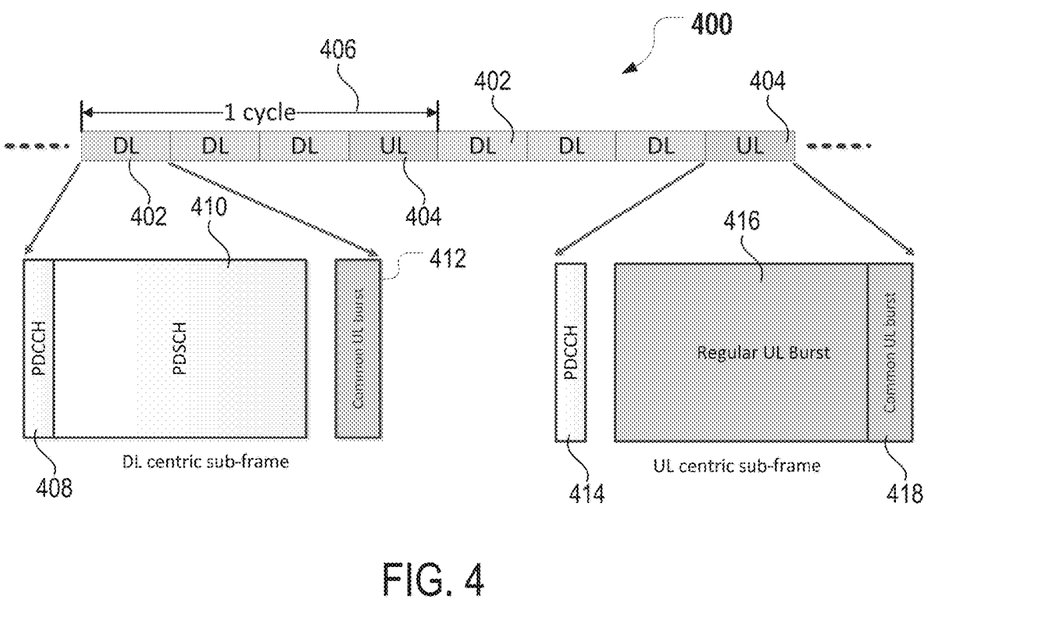
FIG. 4 is a diagram of a self-contained Time Division Duplex (TDD) sub-frame with a common uplink burst design according to embodiments of the present disclosure.

FIG. 4 is a self-contained Time Division Duplex (TDD) sub-frame structure 400 with a common uplink burst design according to embodiments of the present disclosure. As illustrated in FIG. 4, the TDD sub-frame structure 400 may comprise a plurality of downlink (DL) centric sub-frames 402 and at least one uplink (UL) centric sub-frame 404 for each communication cycle 406 between eNB (e.g., eNB 104) and UE (e.g., UE 106). In general, due to asymmetry between DL traffic and UL traffic, a number of DL centric sub-frames 402 per communication cycle 406 can be greater than a number of UL centric sub-frames 404. The ratio can be fixed or variable. In some instances, the number of UL centric sub-frames 404 is greater than the number of DL centric sub-frames 402. Each DL centric sub-frame 402 may comprise a Physical Downlink Control Channel (PDCCH) 408, a Physical Downlink Shared Channel (PDSCH) 410, and a common UL burst 412. Each UL centric sub-frame 404 may comprise a PDCCH 414, a regular UL burst 416, and a common UL burst 418. It can be observed that the same common UL burst structure may be present in both DL centric sub-frames 402 and UL centric sub-frames 404, e.g., the common UL bursts 412 and 418 may comprise the same structure incorporated into each DL centric sub-frame 402 and each UL centric sub-frame 404. For some embodiments, each DL centric sub-frame 402 and UL centric sub-frame 404 of the TDD sub-frame structure 400 may be communicated during a transmission time interval (TTI) with duration of 0.25 ms (e.g., short sub-frame structure). In this case, each common UL burst structure (e.g., the common UL burst 412, and the common UL burst 418) may comprise, for example, two short orthogonal frequency division multiplexing (OFDM) symbols having duration of approximately 33 μs (e.g., for sub-carrier spacing of 60 kHz). It is understood that the frame structure and associated lengths of time of TTIs, PDSCHs, DL bursts, UL bursts, and/or common UL bursts may vary.

Certain embodiments of the present disclosure relate to decoupling uplink control latency from the DL/UL switch pattern. This may be achieved by transmitting control channel information in either a DL centric sub-frame 402 or in an UL centric sub-frame 404. For certain embodiments, the control channel information transmitted from UE to eNB may comprise at least one of: a Physical layer (PHY) Acknowledgement (ACK), a Negative Acknowledgement (NACK), or a Scheduling Request (SR). In one or more embodiments, UE may transmit PHY ACK/NACK to acknowledge (or negatively acknowledge) reception of DL data, whereas SR may represent a request for eNB to provide UL grant so that UE can transmit Physical Uplink Shared Channel (PUSCH).

In accordance with embodiments of the present disclosure, the control channel information may be transmitted from UE to eNB within common UL bursts (e.g., the common UL burst 412 of the DL centric sub-frame 402, and/or the common UL burst 418 of the UL centric sub-frame 404). Further, for some embodiments, a Sounding Reference Signal (SRS) with an optional Buffer Status Report (BSR) may be transmitted from the UE to the eNB within the same common UL bursts. The SRS is a reference signal transmitted by the UE in the UL direction that can be used by the eNB to estimate UL channel quality over a wider bandwidth, whereas the BSR provides a serving eNB with information about an amount of data available for transmission in UL buffers of the UE. For certain embodiments of the present disclosure, the UE may be also configured to transmit UL payload data having low latency requirement, if the UE has power headroom greater than a defined threshold. In one or more embodiment, the UE may transmit low latency UL payload data within common UL bursts of DL centric sub-frames and/or UL centric sub-frames.

Figure 5:
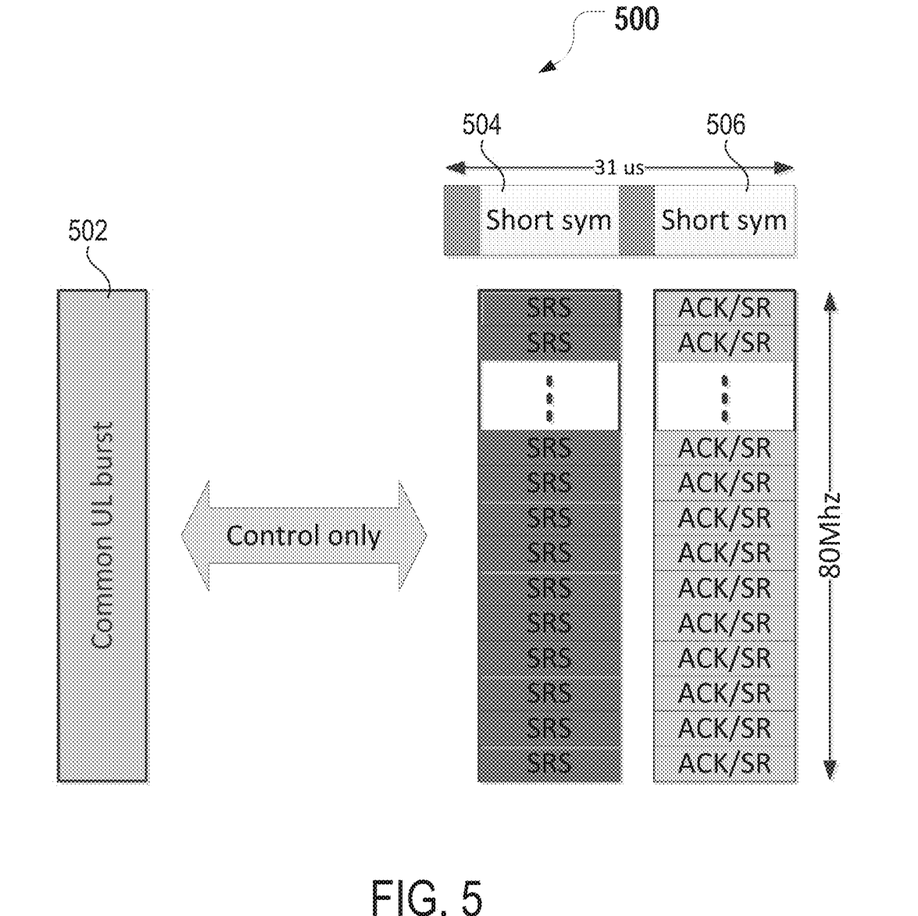
FIG. 5 is a diagram illustrating a structure of a common uplink burst in a coupled mode according to embodiments of the present disclosure.

Embodiments of the present disclosure relate to transmission of SRS and control channel information within common UL bursts utilizing the same bandwidth span (i.e., frequency allocation span). FIG. 5 is a structure 500 illustrating a common UL burst in a coupled SRS mode according to embodiments of the present disclosure. As illustrated in FIG. 5, a common UL burst 502 (e.g., common UL burst 412 of DL centric sub-frame 402 in FIG. 4 and/or common UL burst 418 of UL centric sub-frame 404 in FIG. 4) may comprise two short TDD symbols 504 and 506. In an embodiment of the present disclosure, the symbols 504 and 506 may be OFDM symbols. As further illustrated in FIG. 5, the symbol 504 may comprise SRS, and the symbol 506 may include control channel information that may comprise at least one of ACK, NACK, SR, or BSR. In one or more embodiments, both SRS and control channel information transmitted within the same common UL burst may utilize the same frequency span (e.g., the frequency span of 80 MHz, as illustrated in FIG. 5).

In accordance with certain embodiments of the present disclosure, coupled transmission of SRS and control channel information (e.g., ACK/NACK/SR/BSR) within a common UL burst may be optimized for link budget limited users that only transmit one (spatial) stream. For some embodiments, wide-band SRS may be used as a Demodulation Reference Signal (DM-RS) for control channel information (e.g., ACK/NACK/SR/BSR). When eNB receives a common UL burst comprising coupled SRS and control channel information, eNB having a previous knowledge of SRS may utilize the received SRS to sound a channel between UE and eNB, which may be then used for demodulation of the received control channel information (e.g., ACK/NACK/SR/BSR).

For certain embodiments, control channel information (e.g., ACK/NACK/SR/BSR) may span the same frequency band (e.g., the frequency band of 80 MHz, as illustrated in FIG. 5) as SRS transmitted coupled with the control channel information within the same common UL burst. The energy for transmitting SRS along with control channel information (e.g., ACK/NACK/SR/BSR) within a common UL burst may be leveraged for ACK/NACK/SR/BSR demodulation without transmission of separate DM-RS. In addition, transmission of SRS and ACK/NACK/SR/BSR spanning the same frequency band may increase frequency diversity. In an embodiment of the present disclosure, the SRS and ACK/NACK/SR/BSR may be transmitted within a common UL burst using the same beamforming at UE.

For certain embodiments, common UL burst 502 in FIG. 5 may comprise two-symbol UL burst at the end of each DL centric sub-frame and/or UL centric sub-frame. By employing Time Division Multiplexing (TDM) between SRS and UL payload data within common UL bursts, extra processing margin may be achieved for ACK/NACK turn-around sent in response to DL data.

Certain embodiments of the present disclosure utilize single carrier waveforms for transmission of both SRS and control channel information (e.g., ACK/NACK/SR/BSR), when SRS and control channel information (e.g., Physical Uplink Control Channel (PUCCH)) are transmitted in the coupled mode, i.e., within the same common UL burst. For some embodiments, SRS and PUCCH (e.g., ACK/NACK/SR/BSR) may both use single carrier waveforms to achieve high efficiency of power amplifier(s) at UE. For example, SRS may be spread before transmission by applying Zadoff-chu sequence or pseudo-random sequence with Gaussian minimum shift keying (GMSK) modulation. PUCCH may utilize, for example, Discrete Fourier Transform (DFT)-spread OFDM waveform or GMSK waveforms.

For some embodiments, a shared SRS/PUCCH region may be employed across a plurality of users. Each user of the plurality of users can then be differentiated at eNB based on a different and unique sequence (in code domain). In an embodiment, each spreading sequence that is unique for each user of the plurality of users may be allocated by a network.

Certain embodiments of the present disclosure utilize data-aided channel estimation at eNB to enhance SRS estimation quality. For some embodiments, SRS and PUCCH (ACK/NACK/SR/BSR) may be power-controlled to achieve desirable Signal-plus-Interference-to-Noise Ratio (SINR) at eNB. For example, typical operating point of PUCCH may provide a block error rate (BLER) of less than 1%. Once PUCCH is decoded at eNB, the decoded PUCCH can be treated as an equivalent SRS and used to enhance the SRS estimation quality.

Certain embodiments of the present disclosure relate to a coupled SRS indicator. For some embodiments, a signal may be transmitted from a base station to a UE controlling (requesting) the UE to send SRS in the coupled mode (i.e., to send SRS coupled with control channel information in a common UL burst). A signal may be then transmitted from the UE indicating that the UE transmits SRS in the coupled mode. The base station may utilize the signal transmitted from UE to refine estimation of SRS. Furthermore, the UE may transmit a signal (i.e., change indicator) indicating to the base station that a direction (e.g., beamforming direction) of SRS transmission has changed since a last instance (e.g., since a last SRS transmission). In this way, the UE informs the base station not to filter SRS with a last sub-frame, i.e., not to filter the received SRS using a direction (e.g., beamforming direction) associated with a previously transmitted SRS.

Figure 6:
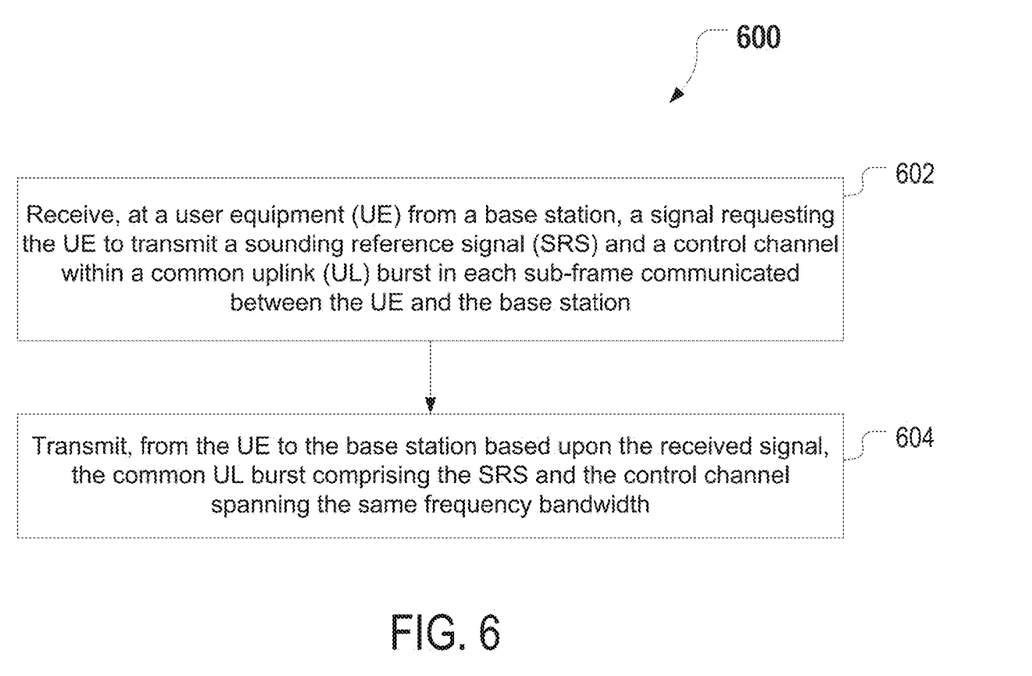
FIG. 6 is a flowchart illustrating an exemplary method for wireless communications that may be performed by a user equipment (UE) according to embodiments of the present disclosure.

FIG. 6 is a flowchart illustrating an exemplary method 600 for coupled mode common UL burst communication according to embodiments of the present disclosure. The method 600 may be implemented in UE 106. The method 600 will be described with respect to a single UE 106 for simplicity of discussion, though it will be recognized that the aspects described herein may be applicable to a plurality of UEs 106, including a network of UEs. It is understood that additional method blocks can be provided before, during, and after the blocks of method 600, and that some of the blocks described can be replaced or eliminated for other embodiments of the method 600.

At block 602, a UE may receive from a base station a signal (e.g., coupled SRS indicator) requesting the UE to transmit a SRS and a control channel (e.g., PUCCH comprising at least one of ACK, NACK, SR, or BSR) within a common UL burst (e.g., common UL burst 412 from FIG. 4, common UL burst 418 from FIG. 4, common UL burst 502 from FIG. 5) in each sub-frame (e.g., DL centric sub-frame 402 from FIG. 4, UL centric sub-frame 404 from FIG. 4) communicated between the UE and the base station. At block 604, the UE may transmit to the base station, based upon the received signal (e.g., coupled SRS indicator), the common UL burst (e.g., common UL burst 502 from FIG. 5) comprising the SRS and the control channel spanning the same frequency bandwidth.

Figure 7:
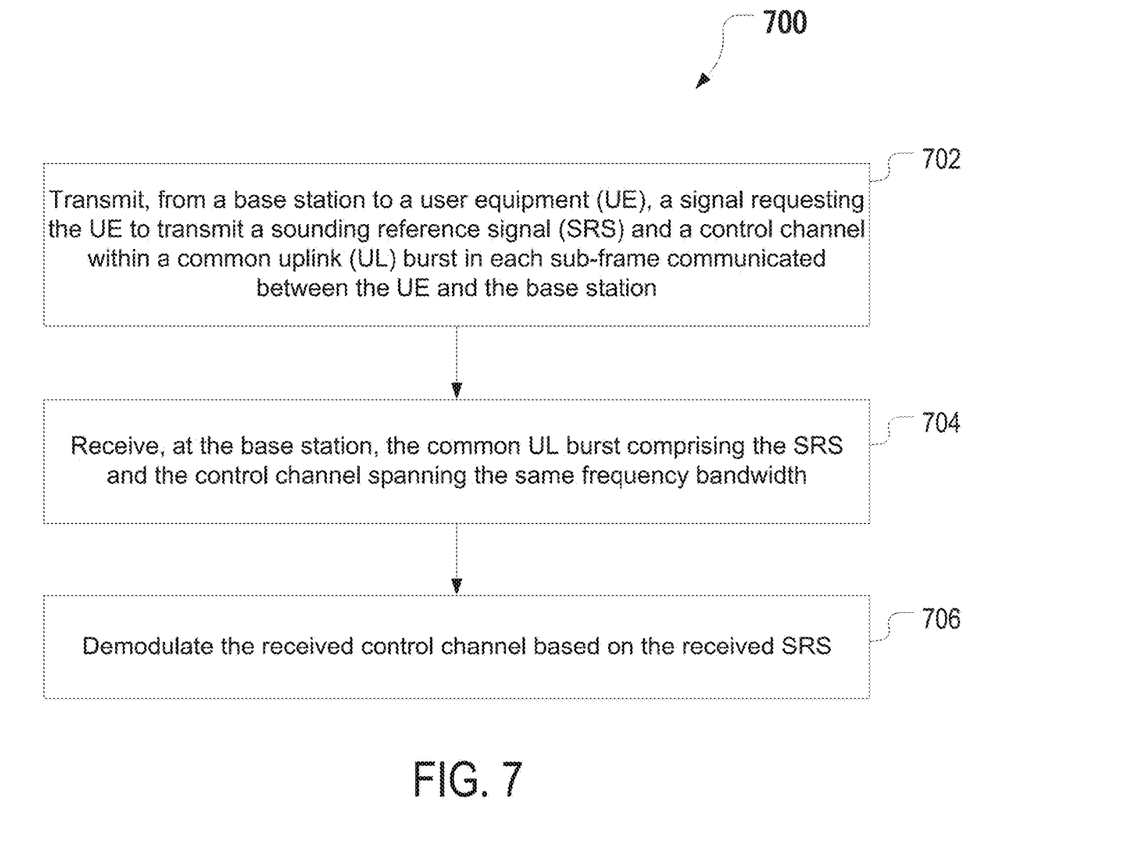
FIG. 7 is a flowchart illustrating an exemplary method for wireless communications that may be performed by a base station (BS) according to embodiments of the present disclosure.

FIG. 7 is a flowchart illustrating an exemplary method 700 for coupled mode common UL burst communication according to embodiments of the present disclosure. The method 700 may be implemented in the base station 104. The method 700 will be described with respect to a single base station 104 in communication with a single UE 106 for simplicity of discussion, though it will be recognized that the aspects described herein may be applicable to a plurality of UEs 106 and/or base stations 104. It is understood that additional method blocks can be provided before, during, and after the blocks of method 700, and that some of the blocks described can be replaced or eliminated for other embodiments of the method 700.

At block 702, a base station may transmit to UE a signal (e.g., coupled SRS indicator) requesting the UE to transmit a SRS and a control channel (e.g., PUCCH comprising at least one of ACK, NACK, SR, or BSR) within a common UL burst (e.g., common UL burst 412 from FIG. 4, common UL burst 418 from FIG. 4, common UL burst 502 from FIG. 5) in each sub-frame (e.g., DL centric sub-frame 402 from FIG. 4, UL centric sub-frame 404 from FIG. 4) communicated between the UE and the base station. At block 704, the base station may receive the common UL burst (e.g., common UL burst 502 from FIG. 5) comprising the SRS and the control channel spanning the same frequency bandwidth. At block 706, the base station may demodulate the received control channel (e.g., PUCCH comprising at least one of ACK, NACK, SR, or BSR) based on the received SRS.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communications, comprising:
   receiving, at a user equipment (UE) from a base station (BS), a signal in one of downlink (DL) sub-frames of a plurality of DL sub-frames, the signal requesting the UE to transmit a sounding reference signal (SRS) and a control channel within a common uplink (UL) burst in each sub-frame communicated between the UE and the BS; and
   transmitting, from the UE to the BS based upon the received signal, the common UL burst comprising the SRS and the control channel, wherein the common UL burst spans the same frequency bandwidth and the same time duration within each DL sub-frame and each UL centric sub-frame communicated between the UE and the BS.

2. The method of claim 1, wherein transmitting the common UL burst comprises:
   transmitting the SRS and the control channel using single carrier waveforms.

3. The method of claim 1, further comprising:
   transmitting, by the UE to the BS, an indication that the SRS and the control channel are coupled in the common UL burst.

4. The method of claim 1, wherein transmitting the common UL burst comprises:
   transmitting low latency UL payload data.

5. The method of claim 1, wherein the control channel comprises at least one of: an acknowledgement (ACK), a negative acknowledgement (NACK), a scheduling request (SR), or a buffer status report (BSR).

6. The method of claim 1, further comprising:
   transmitting, by the UE, the SRS in a first symbol of the common UL burst and the control channel in a second symbol of the common UL burst, wherein
   the first symbol and the second symbol comprise Time Division Duplex (TDD) symbols occupying the same frequency bandwidth.

7. The method of claim 1, further comprising:
   spreading, by the UE, the SRS using a Zadoff-Chu sequence or a pseudo-random sequence before transmitting the SRS within the common UL burst; and
   modulating, by the UE, the spread SRS using Gaussian minimum shift keying (GMSK) modulation before transmitting the SRS within the common UL burst.

8. The method of claim 1, wherein transmitting the common UL burst comprises:
   transmitting the control channel within the common UL burst using a Discrete Fourier Transform (DFT) spread Orthogonal Frequency Division Multiplexing (OFDM) based waveform or a Gaussian minimum shift keying (GMSK) based waveform.

9. The method of claim 1, wherein transmitting the common UL burst comprises:
   transmitting the SRS and the control channel within the common UL burst using a shared region across a plurality of users.

10. The method of claim 1, further comprising:
    receiving, at the UE from a network, a sequence unique for the UE; and
    spreading the SRS and the control channel using the received sequence before transmitting the SRS and the control channel within the common UL burst.

11. The method of claim 1, further comprising:
    performing, by the UE, power control of the SRS and the control channel before transmitting the SRS and the control channel within the common UL burst.

12. The method of claim 1, further comprising:
    receiving, at the UE from the BS, a signal to transmit the SRS and the control channel within the common UL burst; and
    transmitting, by the UE, the SRS and the control channel within the common UL burst based on the received signal.

13. The method of claim 1, further comprising:
    transmitting, by the UE to the BS, a signal indicating that a beamforming direction of the SRS is different than another beamforming direction of another SRS transmitted prior to the SRS.

14. An apparatus, comprising:
    a receiver configured to receive, from another apparatus, a signal in one of downlink (DL) sub-frames of a plurality of DL sub-frames, the signal requesting the apparatus to transmit a sounding reference signal (SRS) and a control channel within a common uplink (UL) burst in each sub-frame communicated between the apparatus and the other apparatus; and
    a transmitter configured to transmit, to the other apparatus based upon the received signal, the common UL burst comprising the SRS and the control channel, wherein the common UL burst span the same frequency bandwidth within each DL sub-frame and each UL centric sub-frame communicated between the apparatus and the other apparatus, and wherein the each UL centric sub-frame includes a regular UL burst and the common UL burst.

15. The apparatus of claim 14, wherein the transmitter is further configured to:
transmit the SRS and the control channel using single carrier waveforms.

16. The apparatus of claim 14, wherein the transmitter is further configured to:
transmit, to the other apparatus, an indication that the SRS and the control channel are coupled in the common UL burst.

17. The apparatus of claim 14, wherein the transmitter is further configured to:
transmit the common UL burst further comprising low latency payload data.

18. The apparatus of claim 14, wherein the control channel comprises at least one of: an acknowledgement (ACK), a negative acknowledgement (NACK), a scheduling request (SR), or a buffer status report (BSR).

19. The apparatus of claim 14, wherein the transmitter is further configured to:
transmit the SRS in a first symbol of the common UL burst and the control channel in a second symbol of the common UL burst, and wherein
the first symbol and the second symbol comprise Time Division Duplex (TDD) symbols occupying the same frequency bandwidth.

20. An apparatus, comprising:
means for receiving, from another apparatus, a signal in one of downlink (DL) sub-frames of a plurality of DL sub-frames, the signal requesting the apparatus to transmit a sounding reference signal (SRS) and a control channel within a common uplink (UL) burst in each sub-frame communicated between the apparatus and the other apparatus; and
means for transmitting, to the other apparatus based upon the received signal, the common UL burst comprising the SRS and the control channel, wherein the common UL burst spans the same frequency bandwidth and the same time duration within each DL sub-frame and each UL centric sub-frame communicated between the apparatus and the other apparatus.

21. The apparatus of claim 20, wherein the means for transmitting is further configured to:
transmit the SRS and the control channel using single carrier waveforms.

22. The apparatus of claim 20, wherein the means for transmitting is further configured to:
transmit, to the other apparatus, an indication that the SRS and the control channel are coupled in the common UL burst.

23. The apparatus of claim 20, wherein the means for transmitting is further configured to:
transmit the common UL burst comprising low latency UL payload data.

24. The apparatus of claim 20, wherein the control channel comprises at least one of: an acknowledgement (ACK), a negative acknowledgement (NACK), a scheduling request (SR), or a buffer status report (BSR).

25. The apparatus of claim 20, wherein the means for transmitting is further configured to:
transmit the SRS in a first symbol of the common UL burst and the control channel in a second symbol of the common UL burst, and wherein
the first symbol and the second symbol comprise Time Division Duplex (TDD) symbols occupying the same frequency bandwidth.

26. A non-transitory computer-readable memory having program code recorded thereon, the program code comprising:
code for causing a user equipment (UE) to receive, from a base station (BS), a signal in one of downlink (DL) sub-frames of a plurality of DL sub-frames, the signal requesting the UE to transmit a sounding reference signal (SRS) and a control channel within a common uplink (UL) burst in each sub-frame communicated between the UE and the BS; and
code for causing the UE to transmit, to the BS based upon the received signal, the common UL burst comprising the SRS and the control channel, wherein the common UL burst spans the same frequency bandwidth within each DL sub-frame and each UL centric sub-frame communicated between the UE and the BS, and wherein the each UL centric sub-frame includes a regular UL burst and the common UL burst.

27. The non-transitory computer-readable memory of claim 26, further comprising:
code for causing the UE to transmit the SRS and the control channel using single carrier waveforms.

28. The non-transitory computer-readable memory of claim 26, further comprising:
code for causing the UE to transmit, to the BS, an indication that the SRS and the control channel are coupled in the common UL burst.

29. The non-transitory computer-readable memory of claim 26, further comprising:
code for causing the UE to transmit the common UL burst comprising low latency payload data.

30. The non-transitory computer-readable memory of claim 26, wherein the control channel comprises at least one of: an acknowledgement (ACK), a negative acknowledgement (NACK), a scheduling request (SR), or a buffer status report (BSR).

31. The non-transitory computer-readable memory of claim 26, further comprising:
code for causing the UE to transmit the SRS in a first symbol of the common UL burst and the control channel in a second symbol of the common UL burst, wherein
the first symbol and the second symbol comprise Time Division Duplex (TDD) symbols occupying the same frequency bandwidth.

32. A method for wireless communications, comprising:
transmitting, from a base station (BS) to a user equipment (UE), a signal in one of downlink (DL) sub-frames of a plurality of DL sub-frames, the signal requesting the UE to transmit a sounding reference signal (SRS) and a control channel within a common uplink (UL) burst in each sub-frame communicated between the UE and the BS;
receiving, at the BS, the common UL burst comprising the SRS and the control channel, wherein the common UL burst spans the same frequency bandwidth and the same time duration within each DL sub-frame and each UL centric sub-frame communicated from the UE; and
demodulating the received control channel based on the received SRS.

33. The method of claim 32, wherein receiving the common UL burst comprises:
receiving low latency UL payload data.

34. The method of claim 32, wherein the control channel comprises at least one of: an acknowledgement (ACK), a negative acknowledgement (NACK), a scheduling request (SR), or a buffer status report (BSR).

35. The method of claim 32, further comprising:
receiving, at the BS, the SRS within a first symbol of the common UL burst and the control channel within a second symbol of the common UL burst, wherein
the first symbol and the second symbol comprise Time Division Duplex (TDD) symbols occupying the same frequency bandwidth.

36. The method of claim 32, further comprising:
despreading, by the BS, the received SRS based on a Zadoff-Chu sequence or a pseudo-random sequence; and
demodulating, by the BS, the despread SRS based on Gaussian minimum shift keying (GMSK).

37. The method of claim 32, further comprising:
despreading and demodulating, by the BS, the received control channel comprising a Discrete Fourier Transform (DFT) spread Orthogonal Frequency Division Multiplexing (OFDM) based waveform or a Gaussian minimum shift keying (GMSK) based waveform.

38. The method of claim 32, further comprising:
allocating, by the BS, a plurality of sequences to a plurality of users, each sequence being unique for a different user of the plurality of users;
receiving, at the BS via a shared region across the plurality of users, the SRS and the control channel within the common UL burst spread based on that sequence; and
despreading the received SRS and the control channel using that sequence.

39. The method of claim 32, further comprising:
enhancing, by the BS, estimation of the SRS based on the demodulated control channel.

40. The method of claim 32, further comprising:
receiving, at the BS, an indication that the SRS and the control channel are coupled in the common UL burst; and
decoding the received UL burst with the SRS and the control channel based on the received indication.

41. The method of claim 32, further comprising:
receiving, at the BS, a signal indicating that a beamforming direction of the SRS is different than another beamforming direction of another SRS received prior to the SRS; and
filtering the received SRS based on the beamforming direction of the SRS.

42. An apparatus, comprising:
a transmitter configured to transmit, to another apparatus, a signal in one of downlink (DL) sub-frames of a plurality of DL sub-frames, the signal requesting the other apparatus to transmit a sounding reference signal (SRS) and a control channel within a common uplink (UL) burst in each sub-frame communicated between the other apparatus and the apparatus;
a receiver configured to receive the common UL burst comprising the SRS and the control channel, wherein the common UL burst spans the same frequency bandwidth within each DL centric sub-frame and each UL centric sub-frame communicated between the apparatus and the other apparatus, and wherein the each UL centric sub-frame includes a regular UL burst and the common UL burst; and
a processor configured to demodulate the received control channel based on the received SRS.

43. The apparatus of claim 42, wherein the receiver is further configured to:
receive the common UL burst further comprising low latency UL payload data.

44. The apparatus of claim 42, wherein the control channel comprises at least one of: an acknowledgement (ACK), a negative acknowledgement (NACK), a scheduling request (SR), or a buffer status report (BSR).

45. The apparatus of claim 42, wherein the receiver is further configured to:
receive the SRS within a first symbol of the common UL burst and the control channel within a second symbol of the common UL burst, and wherein
the first symbol and the second symbol comprise Time Division Duplex (TDD) symbols occupying the same frequency bandwidth.

46. An apparatus, comprising:
means for transmitting, to another apparatus, a signal in one of downlink (DL) sub-frames of a plurality of DL sub-frames, the signal requesting the other apparatus to transmit a sounding reference signal (SRS) and a control channel within a common uplink (UL) burst in each sub-frame communicated between the other apparatus and the apparatus;
means for receiving the common UL burst comprising the SRS and the control channel, wherein the common UP burst spans the same frequency bandwidth and the same time duration within each DL centric sub-frame and each UL centric sub-frame communicated between the apparatus and the other apparatus; and
means for demodulating the received control channel based on the received SRS.

47. The apparatus of claim 46, wherein the means for receiving is further configured to:
receive the common UL burst further comprising low latency UL payload data.

48. The apparatus of claim 46, wherein the control channel comprises at least one of: an acknowledgement (ACK), a negative acknowledgement (NACK), a scheduling request (SR), or a buffer status report (BSR).

49. The apparatus of claim 46, wherein the means for receiving is further configured to:
receive the SRS within a first symbol of the common UL burst and the control channel within a second symbol of the common UL burst, and wherein
the first symbol and the second symbol comprise Time Division Duplex (TDD) symbols occupying the same frequency bandwidth.

50. A non-transitory computer-readable memory having program code recorded thereon, the program code comprising:
code for causing a base station (BS) to transmit, to a user equipment (UE), a signal in one of downlink (DL) sub-frames of a plurality of DL sub-frames, the signal requesting the UE to transmit a sounding reference signal (SRS) and a control channel within a common uplink (UL) burst in each sub-frame communicated between the UE and the BS;
code for causing the BS to receive the common UL burst comprising the SRS and the control channel, wherein the common UL burst spans the same frequency bandwidth within each DL centric sub-frame and each UL centric sub-frame communicated between the UE and the BS, and wherein the each UL centric sub-frame includes a regular UL burst and the common UL burst; and
code for causing the BS to demodulate the received control channel based on the received SRS.

51. The non-transitory computer-readable memory of claim 50, further comprising:

code for causing the BS to receive the common UL burst further comprising low latency payload data.

52. The non-transitory computer-readable memory of claim 50, wherein the control channel comprises at least one of: an acknowledgement (ACK), a negative acknowledgement (NACK), a scheduling request (SR), or a buffer status report (BSR).

53. The non-transitory computer-readable memory of claim 50, further comprising:
   code for causing the BS to receive the SRS within a first symbol of the common UL burst and the control channel within a second symbol of the common UL burst, wherein
   the first symbol and the second symbol comprise Time Division Duplex (TDD) symbols occupying the same frequency bandwidth.

* * * * *